United States Patent [19]
Wilkinson

[11] Patent Number: 4,464,685
[45] Date of Patent: Aug. 7, 1984

[54] METHOD AND APPARATUS FOR DECODING AND RECORDING COMPOSITE DIGITAL TELEVISION SIGNALS TO PREVENT DEGRADATION OF THE SIGNALS

[75] Inventor: James H. Wilkinson, Tadley, near Basingstoke, England

[73] Assignee: Sony Corporation, Tokyo, Japan

[21] Appl. No.: 537,781

[22] Filed: Sep. 30, 1983

Related U.S. Application Data
[63] Continuation of Ser. No. 226,824, Jan. 21, 1981.

[30] Foreign Application Priority Data

Jan. 30, 1980 [GB] United Kingdom ................. 8003083

[51] Int. Cl.$^3$ ......................... H04N 9/191; H04N 9/36
[52] U.S. Cl. ...................................... 358/310; 358/13; 358/15
[58] Field of Search ................................... 358/11–13, 358/15, 16, 138, 310; 360/32, 39; 382/41

[56] References Cited

U.S. PATENT DOCUMENTS

| | | | |
|---|---|---|---|
| 3,764,739 | 10/1973 | Faroustja .......................... | 358/15 X |
| 3,889,288 | 6/1975 | Rennick ................................. | 358/11 |
| 4,051,516 | 9/1977 | Weston ............................. | 358/13 X |
| 4,051,517 | 9/1977 | Hjortzberg ........................... | 358/15 |
| 4,212,028 | 7/1980 | Drewery .......................... | 358/13 X |
| 4,268,861 | 5/1981 | Schreiber et al. .................... | 358/138 |

FOREIGN PATENT DOCUMENTS

| | | |
|---|---|---|
| 1387427 | 3/1975 | United Kingdom . |
| 1455822 | 11/1976 | United Kingdom . |
| 1457107 | 12/1976 | United Kingdom . |
| 2068673 | 8/1981 | United Kingdom ................. 358/310 |

OTHER PUBLICATIONS

"Electronic Field Stove Standards Convertor" Davies et al., Proc. IEEE, vol. 118, No. 3/4, Mar./Apr. 1971, pp. 460–467.

"Television Standards Converter Using Digital Techniques" The Radio & Electronic Engr., vol. 43, No. 3, Mar. 1973, pp. 230–232.

"Low Bit Rate System for Digital Coding of the Television Picture" Rainger et al., Journal of the SMPTE, vol. 88, Aug. 79, pp. 550–554.

Primary Examiner—Aristotelis M. Psitos
Attorney, Agent, or Firm—Lewis H. Eslinger; Alvin Sinderbrand

[57] ABSTRACT

A decoder-recoder arrangement for decoding a composite digital television signal for recording on a digital video recorder and for subsequently recoding the reproduced signal, the arrangement comprising a decoder including filters for separating two chrominance components from the composite digital television signal, demodulators for demodulating the chrominance components, sample rate reducers for reducing the sample rates of the demodulated chrominance components, interpolators for interpolating samples into the sample-reduced demodulated chrominance components to restore the sample rate to the original value, modulators for remodulating the interpolated chrominance components, an adder for adding together the modulated interpolated chrominance components, and a subtractor for subtracting the output of the adder from the input composite digital television signal; and a recoder including interpolators for interpolating samples into said sample-reduced demodulated chrominance components to restore the sample rate to the orignal sample value, modulators for modulating the interpolated chromiance components obtained from the interpolators, an adder for adding together the outputs of the modulators, and a further adder for adding the output of the adder to the output of the subtractor of the decoder to derive the original composite digital television signal.

21 Claims, 3 Drawing Figures

METHOD AND APPARATUS FOR DECODING AND RECORDING COMPOSITE DIGITAL TELEVISION SIGNALS TO PREVENT DEGRADATION OF THE SIGNALS

This is a continuation of application Ser. No. 6,226,824, filed Jan. 21, 1981.

BACKGROUND OF THE INVENTION

1. Field of the Invention

This invention relates to methods of and arrangements for decoding and recoding composite digital television signals. The invention is particularly, but not exclusively, concerned with the decoding and recording of composite digital PAL or NTSC television signals.

2. Description of the Prior Art

When a composite digital PAL television signal has been recorded on a digital video tape recorder, it may be required to reproduce the recorded signal, decode it to obtain the original luminance component Y and the two chrominance components U and V, for example for the purpose of displaying a picture on a television monitor for editing purposes, and then to recode the components Y, U and V, and to re-record the signal so produced. Using known PAL decoders and coders, each time the signal is decoded and recoded there is some degradation of the resulting television picture. Such degradation is cumulative and so if there are many generations of decoding and recoding, as may well occur in a complex editing process, the final television picture is substantially degraded.

This problem arises not from any inherent characteristic of the PAL system, but from that in the composite digital PAL television signal the components Y, U and V share a common frequency band, If it were possible completely to separate the components Y, U and V into isolated spectra in a decoder, this would permit perfect decoding, and on recoding the original coded signal could be perfectly reformed. In this case, decoding and recoding could be repeated as often as required without consequent picture degradation.

In practice, however, complete separation of the components Y, U and V is not economically possible as it would involve very complex or so-called multi-dimensional filtering, which not only performs separation on the normal frequency basis, but also on the basis of frequency in the television picture height direction and on the basis of time.

SUMMARY OF THE INVENTION

One object of the present invention is to provide an improved method of decoding and recoding composite digital television signals.

Another object of the present invention is to provide a method of decoding and recoding composite digital television signals which is substantially free of comulative errors.

Another object of the present invention is to provide an arrangement for decoding and recoding composite digital television signals that does not require complex or multi-dimensional filters.

According to the present invention there is provided a method of decoding and subsequently recording a composite digital televison signal comprising the steps of:

in a decoding operation:

separating from said composite digital television signal a chrominance component;

demodulating said chrominance component;

reducing the sample rate of the demodulated chrominance component to form a first decoder output signal;

interpolating samples into the sample-reduced demodulated chrominance component to restore the sample rate to the original value;

modulating the interpolated chrominance component; and subtracting the modulated interpolated chrominance component from said composite digital televison signal to form a second decoder output signal;

and in a recoding operation:

interpolating samples into said first decoder output signal to restore the sample rate to said original value;

modulating the interpolated chrominance component obtained by the immediately preceding step; and adding the modulated interpolated chrominance component obtained by the immediately preceding step to said second decoder output signal to reform said composite digital television signal.

According to the present invention there is also provided a method of decoding and subsequently recoding a composite digital PAL television signal comprising the steps of:

in a decoding operation:

separating from said composite digital PAL television signal first and second chrominance components, each of said chrominance components and the luminance component of said composite digital PAL television signal having the same predetermined sample rate;

demodulating said first and second chrominance components;

reducing the sample-rate of the demodulated first and second chrominance components to form first and second decoder output signals respectively;

interpolating samples into the sample-reduced demodulated first and second chrominance components to restore the sample rate of each of said sample-reduced demodulated first and second chrominance components to said predetermined sample rate;

modulating the interpolated first and second chrominance components; adding together the modulated interpolated first and second chrominance components to form a sum chrominance component; and subtracting said sum chrominance component from said composite digital digital television signal to form a third decoder output signal;

and in a recoding operation:

interpolating samples into said first and second decoder output signals to restore the sample rate of each of said sample-reduced demodulated first and second chrominance components to said predetermined sample rate;

modulating the interpolated first and seciond chrominance components obtained by the immediately preceding step;

adding together the modulated interpolated first and second chrominance components obtained by the immediately preceding step to form a sum chrominance component; and adding said sum chrominance component obtained by the immediately preceding step to said third decoder signal to reform said composite digital PAL television signal.

According to the present invention there is also provided a decoder-recoder arrangement for a composite digital television signal, the arrangement comprising:

a decoder including:

means for separating from said composite digital television signal a chrominance component;

a demodulator for demodulating said chrominance component;

a sample rate reducer for reducing the sample-rate of the demodulated chrominance component to form a first decoder output signal;

a first interpolator for interpolating samples into the sample-reduced demodulated chrominance component to restore the sample rate to the original value;

a first modulator for modulating the interpolated chrominance component; and a subtractor for subtracting the modulated interpolated chrominance component from said composite digital television signal fo form a second decoder output signal;

and a recoder including:

a second interpolator for interpolating samples into said first decoder output signal to restore the sample rate to said original value;

a second modulator for modulating the interpolated chrominance component obtained from said second interpolator; and an adder for adding the modulated interpolated chrominance component obtained from said second modulator to said second decoder output signal to reform said composite digital televison signal.

According to the present invention there is also provided a decoder-recoder arrangement for a composite digital PAL television signal, the arrangement comprising:

a decoder including:

means for separating from said composite digital PAL television signal first and second chrominance components, each of said chrominance components and the luminance component of said composite digital PAL television signal having the same predetermined sample rate;

first and second demodulators for respectively demodulating said first and second chrominance components;

first and second sample rate reducers for respectively reducing the sample rates of the demodulated first and second chrominance components to form first and second decoder output signals respectively;

first and second interpolators for respectively interpolating samples into the sample-reduced demodulated first and second chrominance components to restore the sample rates thereof to said predetermined sample rate;

first and second modulators for modulating the interpolated first and second chrominance components;

a first adder for adding the modulated interpolated first and second chrominance components together to form a sum chrominance component; and a subtractor for subtracting said sum chrominance component from said composite digital PAL television signal to form a third decoder output signal;

and a recoder including:

third and fourth interpolators for respectively interpolating samples into said first and second decoder output signals to restore the sample rates of each of said sample-reduced demodulated first and second chrominance components to said predetermined sample rate;

third and fourth modulators for respectively modulating the interpolated chrominance components obtained from said third and fourth interpolators; a second adder for adding the modulated interpolated first and second chrominance components obtained from said third and fourth modulator respectively to form a sum chrominance component; and a third adder for adding the sum chrominance component obtained from said second adder to said third decoder output signal to reform said composite digital PAL television signal.

The above, and other objects, features and advantages of this inventiion will be apparent from the following detailed description of illustrative embodiments which is to be read in connection with the accompanying drawings.

DESCRIPTION OF THE PREFERRED EMBODIMENTS

Figure 1:
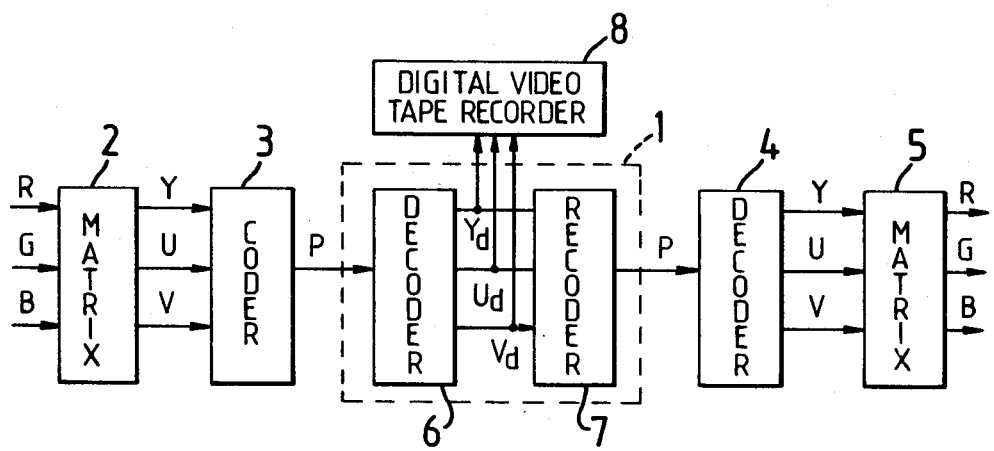
FIG. 1 shows part of a digital television signal processing system in which embodiments of the invention can be used.

Referring to FIG. 1, and neglecting for the moment the decoder-recoder arrangement 1 outlined by the broken lines, the signal processing system shown comprises a matrix 2 which receives the usual signals R, G and B over respective input paths, for example from a television camera, and from the signals R, G and B derives the usual luminance signal component Y and chrominance signal components U and V. The signal components Y, U and V are supplied over respective paths to a coder 3 which digitizes them by sampling each of the signal components Y, U and V, for example at 12 Megasamples per second, and from the resulting sampled pulse coded signal components produces a composite digital PAL television signal P.

The composite digital PAL signal P could then be supplied directly to a decoder 4, which would separate the pulse coded signal components corresponding respectively to the signal components Y, U and V and from the separated pulse coded signal components reform analog signal components Y, U and V for supply over respective output paths to a matrix 5. The matrix 5 would then derive signals R, G and B, corresponding to the origianl signals R, G and B, and supply them over respective output paths, for example to a television receiver.

However, if the composite digital PAL signal P is to be recorded and subsequently reproduced between the coder 3 and the decoder 4, then additional steps of decoding and recoding are required in cases where the composite digital PAL signal P is to be recoded in the form of the signal components Y, u and V. Similar considerations may arise when the composite digital PAL signal P is to be passed over an extended transmission path between the coder 3 and the decoder 4. This then is the purpose of the decoder-recoder arrangement 1, which comprises a decoder 6 and a recoder 7. Briefly, the decoder 6 derives from the composite digital PAL signal P digital luminance and chrominance signal components $Y_d$, $U_d$ and $V_d$ all at 12 Megasamples per second, which may be supplied directly over respective output paths to the recoder 7 which derives from them the composite digital PAL signal P, but will usually be supplied to a digital video tape recorder 8 for recording. On subsequent reproduction by the digital video tape recorder 8, the reproduced digital signal components $Y_d$, $U_d$ and $V_d$ are supplied to the recoder 7.

It is accepted that the coder 3 and the decoder 4 cause some degradation of the television picture, but as the coding and decoding steps are only performed once by these elements, any such degradation is small and in consequence acceptable. On the other hand, the decoding and recoding steps effected by the decoder 6 and the recoder 7 may be repeated many times, for example in a complex ediging process involving multiple recording and reproducing steps. It is therefore important that impairments introduced by the coder-recoder arrangement 1 be reduced as much as possible, because any such impairment will be cumulative and result in substantial picture degradation.

Before going on to consider specific examples of the decoder 6 and recoder 7 in detail, it is helpful to consider in more detail what happens when the composite digital PAL signal P is recorded on and reproduced from the digital video tape recorder 8. Firstly, it should be noted that each of the signal components Y, U and V has been sampled at 12 Megasamples per second, giving a total of 36 Megasamples per second. However, because the eye is much less sensitive to color informatiofn than to luminance information, it is possible to save bandwidth in the digital video tape recorder 8 (or in an extended transmission path) by omitting some of the samples corresponding to the chrominance components U and V. For example, if every other sample were omitted prior to recording, then the omitted samples could be re-created with reasonable accuracy on reproduction by interpolating an extra sample in every space between the actual samples reproduced. The analog levels of the extra samples could be determined by simple averaging of the levels of the actual samples on each side of each space. In practice, however, it is more usual, and a satisfactory television picture results if two out of three samples in each of the chrominance components U and V are omitted, this being because the maximum chrominance frequency can be reduced to 2 MHz. This reduces the total number of samples to be recorded to 20 Megasamples per second. Also in practice, the interpolation necessary to produce the necessary extra samples on reproduction uses a more sophisticated technique than mere averaging. However, such techniques are known and are not of direct relevance to the present invention, so this aspect will not be further discussion herein. It is sufficient for present purposes to appreciate that the necessary interpolation following a sample rate reduction cannot perfectly reproduce the original samples, and inevitably there will be errors in the recreated samples particularly at higher frequencies. Thus, the repeated omission and re-creation of samples will result in cumulative error and substantial picture degradation.

The embodiment to be described operates by arranging that information concerning the errors which will occur when samples are recreated for interpolation into the sample-rate reduced chrominance component and is carried in the luminance component, the sample rate of which has not been reduced.

Figure 2:
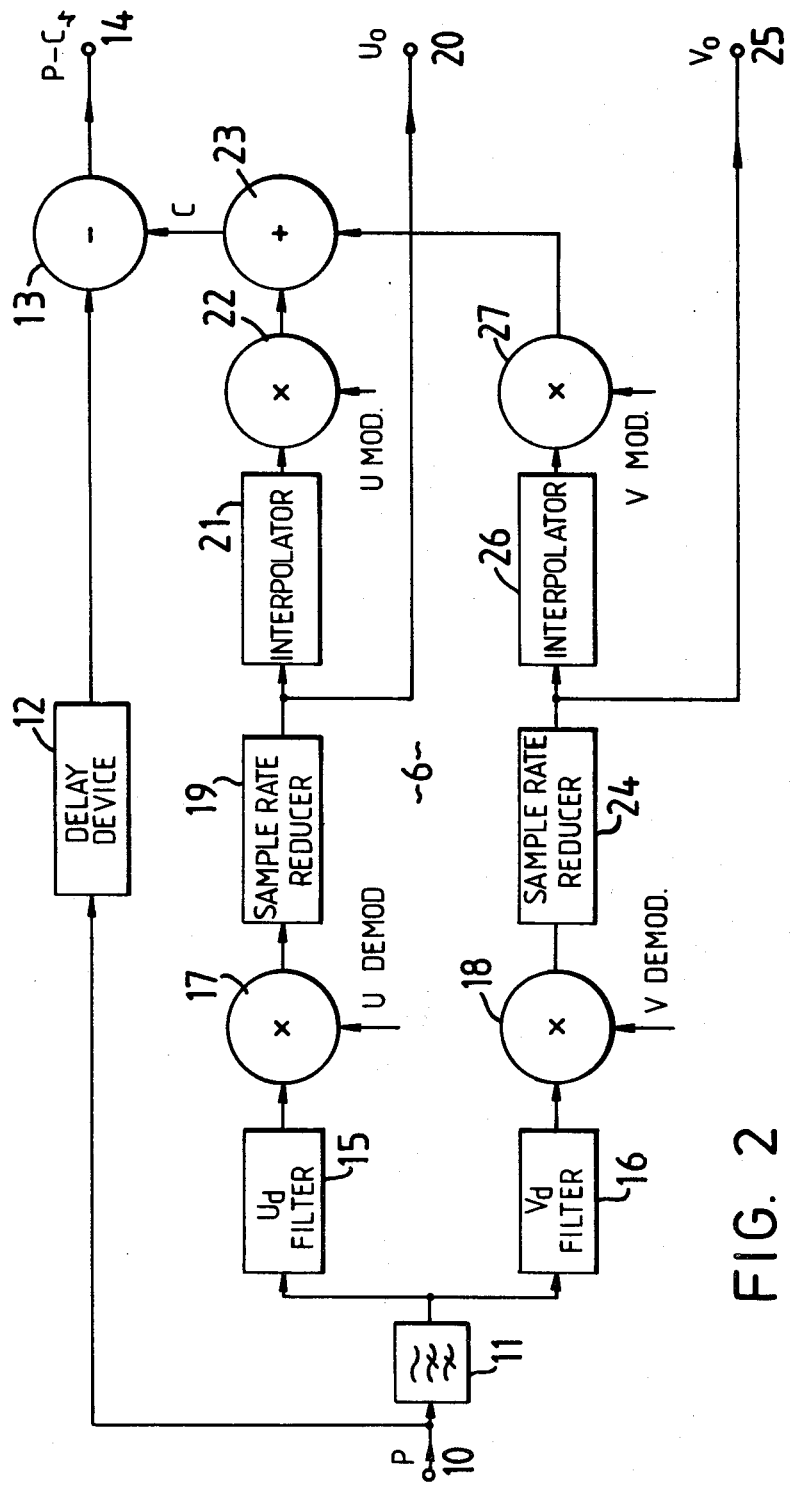
FIG. 2 show diagrammatically a decoder forming part of an embodiment of the invention.

Referring now to FIG. 2, this shows the decoder 6 of FIG. 1 in more detail. The decoder 6 has an input terminal 10 to which the composite digital PAL signal P is supplied and which is connected to a chrominance filter 11, and by way of a delay device 12 and a subtractor 13 to a first output terminal 14. The output of the chrominance filter 11 is connected to the respective inputs of a $U_d$ filter 15 and a $V_d$ filter 16, the outputs of which are respectively connected to U and V signal demodulators 17 and 18. The ouput of the U signal demodulator 17 is connected to a sample rate reducer 19 which supplies an output sample-reduced chrominance signal component $U_0$ to a second output terminal 20. Also, the output of the sample rate reducer 19 is connected to an interpolator 21, the output of which is supplied via a U signal modulator 22 to an adder 23. The output of the $V_d$ signal demodulator 18 is connected to a sample rate reducer 24 which supplies an output sample-reduced chrominance signal component $V_0$ to a third output terminal 25. Also, the output of the sample rate reducer 24 is connected to an interpolator 26, the output of which is supplied via a V signal modulator 27 to the adder 23.

If desired, the positions of the $U_d$ filter 15 and the signal demodulator 17 can be interchanged, as can the positions of the $V_d$ filter 16 and the demodulator 18.

Figure 3:
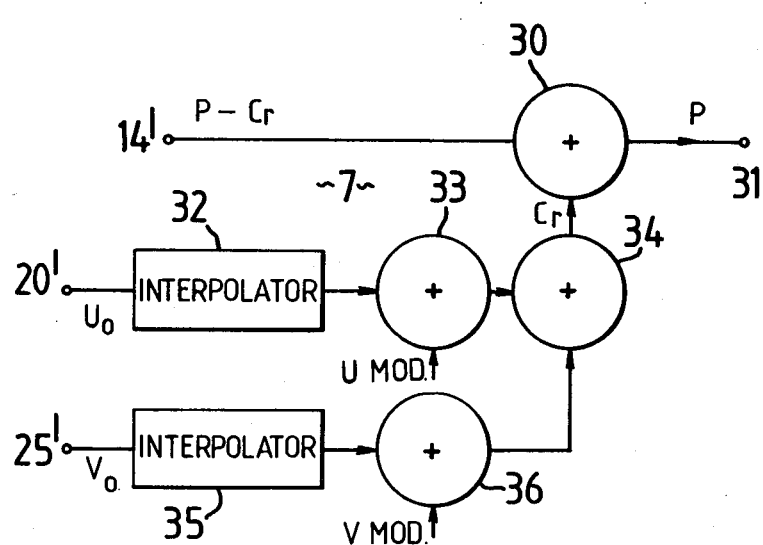
FIG. 3 shows diagrammatically a recoder forming part of an embodiment of the invention.

Referring now to FIG. 3, this shows the recoder 7 of FIG. 1 in more detail. The recoder 7 comprises first, second and third input terminals 14', 20' and 25', these numerals being used because these terminals correspond respectively to the first, second and third output terminals 14, 20 and 25 of the coder decoder 6 of FIG. 2 and respectively receive the signals supplied to the output terminals 14, 20 and 25, although this will usually be after intervening steps of recording and reproducing the signals from the digital video tape recorder 8 or after passing the signals over an extended transmission path. The first input terminal 14' is connected by way of an adder 30 to an output terminal 31 of the recorder 7. The second input terminal 20' is connected by way of an interpolator 32 and a U signal modulator 33 to an adder 34. The third input terminal 25' is connected by way of an interpoator 35 to a V signal modulator 36, the output of which is connected to the adder 34. the output of the adder 34 is connected to the adder 30.

The interpolators 21 and 26, the signal modulators 22 and 27 and the adder 23 in the decoder 6 correspond respectively to the interpolators 32 and 35, the signal modulators 33 and 36 and the adder 34 in the recoder 7 and are as near as possible identical in form and operation therewith. These elements can conveniently be made as integrated circuits, which assists in fulfilling this requirement.

The operation of the decoder 6 will now be described with reference to FIG. 2. The chrominance filter 11 separates the chrominance components $U_d$ and $V_d$ from the incoming composite digital PAL signal P, and for this purpose is a high-pass filter passing the higher frequency band of the composite digital PAL signal P. The $U_d$ and $V_d$ filters 15 and 16 are comb filters which respectively separate the chrominance components $U_d$ and $V_d$ which are then demodulated in the U and V signal demodulators 17 and 18 respectively. Both demodulated signals have a sample rate of 12 Megasamples per second and this is reduced to 4 Megasamples per second by the sample rate reducers 19 and 24 respectively, both of which ómit two samples in every three. The outputs of the sample rate reduces 19 and 24 are therefore sample-reduced chrominance components $U_0$ and $V_0$ each having a sample rate of 4 Megasamples per second and which are supplied to the second and third output terminals 20 and 25 respectively for recording. Additionally, however, the sample-reduced chrominance components $U_0$ and $V_0$ are supplied to the interpolators 20 and 26 respectively where they are subjected to the same interpolation process as will occur in the recorder 7. Thus, the two out of three omitted samples are re-created and interpolated to restore the sample rate to 12 Megasamples per second. The two interpolated chrominance components are then remodulated in the U and V signal modulators 22 and 27 respectively, the outputs of which are added together in the adder 23 to form a sum chrominance component Cr which is subtracted from the composite digital PAL signal P by the subtractor 13 to form an output signal P-CR which is supplied to the first oiutput terminal 14 for recording. As the elements of the decoder 6 handling the chrominance component will cause some delay, the composite digital PAL signal P passing to the subtractor 13 must be correspondingly delayed, and this delay is effected by the delay device 12.

The operation of the recorder 7 will now be described with reference to FIG. 3. The sample-reduced chrominance components $U_0$ and $V_0$ supplied to the second and third input terminals 20' and 25' are supplied to to interpolators 32 and 35 respectively where they are subjected to the same interpolation process as occurred in the decoder 6. Thus, the two out of three omitted samples are re-created and the sample rate so restored to 12 Megasamples per second. The two interpolated chrominance components are modulated in the U and V signal modulators 33 and 36 respectively, the outputs of which are added in the adder 34 to form once again the sum chrominance component Cr which is added to the input signal P-Cr supplied from the first input terminal 14' to the adder 30, the output of which is the original composite digital PAL signal P and which is supplied to the output terminal 31.

Considering the overall operation of the decoder 6 and the recoder 7, therefore, the composite digital PAL signal P has subtracted from it the sum chrominance component Cr which contains errors inherent in the interpolation process. These errors are therefore present in the recorded signal P-Cr. However, in the recoder 7 the same sum chrominance component Cr is re-created with the same errors due to the interpolation process, and the sum chrominance component Cr is added to the input signal P-Cr thereby compensating the errors and providing a substantially error-free ouput composite digital PAL signal P.

It will readily be appreciated that various modifications and extensions ae possible. For example, the embodiment described is for a PAL television signal, but the invention can also be applied to other composite band-sharing television signals such as the NTSC signal, in which case the digital components for recording would be the luminance component Y and the chrominance components I and Q. Moreover, it is not essential that the separation is into a luminance component and two chrominance components, as there may for example be circumstances in which sufficient chrominance data reduction can be achieved by separating into a luminance component and a single chrominance component carrying, in the PAL system for example, the U and V chrominance information. Also, although the invention has been described for use with a digital video tape recorder, it can of course be used with other digital video recorders where separation of the luminance and chrominance components is required for recording purposes and, as mentioned above, it can be used in other circumstances where such decoding and recoding is necessary, particularly where these processes are carried out many times, as for example in an extended transmission path linking widely spaced transmitting and receiving points.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

I claim:

1. A method of decoding, processing and subsequently recoding a composite digital color television signal having a luminance component and at least one chrominance component, comprising:
   decoding said composite digital television signal by the steps of:
   separating from said composite digital color television signal said at least one chrominance component which has been digitized by being sampled at a first sample rate;
   reducing the sample rate of the separated chrominance component to provide a sample-reduced chrominance component forming a first decoder output signal;
   interpolating samples into the sampe-reduced chrominance component in response to the sample-reduced chrominance component to provide an interpolated chrominance component having its sample rate restored to the original value of the first sample rate; and
   subtracting the interpolated chrominance component from said composite digital television signal to form a second decoder output signal containing said luminance component and information as to errors in said samples interpolated into the sample-reduced chrominance component; processing said first and second decoder output signals; and
   recoding said composite digital television signal from the processed first and second decoder output signals by the steps of:
   interpolating samples into said processed first decoder output signal in a manner substantially identical to said first-mentioned step of interpolating and in response to said processed first decoder output signal to provide a second interpolated chrominance component having its sample rate restored to said original value; and
   adding the second interpolated chrominance component obtained by the immediately preceding step to said processed second decoder output signal to provide a reformed composite digital color television signal in which errors due to interpolation are compensated.

2. A method according to claim 1 wherein said composite digital television signal is a PAL television signal.

3. A method according to claim 1 wherein said composite digital television signal is an NTSC signal.

4. A method according to claim 1 wherein said step of decoding includes the step of demodulating said chrominance component prior to said step of reducing, and the step of modulating the first-mentioned interpolated chrominance component prior to the step of subtracting; and the step of recoding includes the step of modulating the second interpolated chrominance component between said step of interpolating samples into said first decoder signal and said step of adding.

5. The method according to claim 1; in which said processing includes recording and then reproducing said first and second decoder output signals.

6. A method of decoding, processing and subsequently recoding a composite digital PAL color television signal having at least a luminance component and first and second chrominance components, comprising:
  decoding said composite digital PAL color television signal by the steps of:
  separating from said composite digital PAL television signal said first and second chrominance components, each of said chrominance components and the luminance component of said composite digital PAL color television signal having the same predetermined sample rate;
  reducing the sample-rate of the separated first and second chrominance components to provide sample-reduced first and second chrominance components, which form first and second decoder output signals, respectively;
  interpolating samples into the sample-reduced first and second chrominance components in response to the respective sample-reduced first and second chrominance components to provide interpolated first and second chrominance components having their sample rates restored to said predetermined sample rate;
  adding together the interpolated first and second chrominance components to form a sum chrominance component; and
  subtracting said sum chrominance component from said composite digital PAL television signal to form a third decoder output signal containing said luminance component and information as to errors in the samples interpolated into the sample-reduced first and second chrominance components;
  processing said first, second and third decoder output signals; and
  recoding said composite digital PAL television signal from the processed first, second and third decoder output signals by the steps of:
  interpolating samples into said processed first and second decoder output signals in a manner substantially identical to said first mentioned step of interpolating and in response to said processed respective first and second decoder output signals to provide interpolated third and fourth chrominance components having their sample rates restored to said predetermined sample rate;
  addin together the interpolated third and fourth chrominance components to form a second sum chrominance component; and
  adding said second sum chrominance component to said processed third decoder output signal to provide a reformed composite digital PAL color television signal in which errors due to interpolation are compensated.

7. A method according to claim 6 wherein said step of decoding includes the step of demodulating the first and second chrominance components prior to the step of reducing, and the step of modulating the interpolated first and second chrominance components prior to the first step of adding; and the step of recoding includes the step of modulating the interpolated third and fourth chrominance components obtained by the step of interpolating samples into said first and second decoder output signals, prior to said step of adding which forms said second sum chrominance component.

8. The method according to claim 6; in which said processing includes recording and then reproducing said first, second and third decoder output signals.

9. An arrangement for decoding and recoding a composite digital color television signal having at least a luminance component and one chrominance component before and after, respectively, processing of said television signal the arrangement comprising:
  decoder means including:
  means for separating from said composite digital color television signal said at least one chrominance component which has been digitized by being sampled at a first sample rate;
  sample rate reducer means for reducing the samplerate of the separated chrominance component to provide a sample-reduced chrominance component forming a first decoder output signal;
  first interpolator means for interpolating samples into the sample-reduced chrominance component in response to the sample-reduced chrominance component to provide an interpolated chrominance component having its sample rate restored to the original value of the first sample rate; and
  subtractor means for subtracting the interpolated chrominance component from said composite digital television signal to form a second decoder output signal containing said luminance component and information as to errors in the samples interpolated into the sample-reduced chrominance component; and
  recoder means acting on said first and second decoder output signals after the processing thereof as said color television signal and including:
  second interpolator means for interpolating samples into the processed first decoder output signal in a manner substantially identical to that of said first interpolator means and in response to said processed chrominance component having its sample rate restored to said original value; and
  adder means for adding the second interpolated chrominance component obtained from said second interpolator means to the processed second decoder output signal to provide a reformed composite digital color television signal in which errors due to interpolation are compensated.

10. A decoder-recoder arrangement according to claim 9 wherein said decoder means includes demodulator means for demodulating said chrominance component from said means for separating, and first modulator means for modulating the first-mentioned interpolated chrominance component from said first interpolator means; and said recoder means includes second modulator means for modulating the second interpolated chrominance component from said second interpolator means.

11. An arrangement according to claim 9 further comprising magnetic recording and reproducing means for effecting said processing of the television signal by recording and reproducing said first and second decoder output signals.

12. An arrangement according to claim 9 wherein said composite digital television signal is a PAL television signal.

13. An arrangement according to claim 9 wherein said composite digital television signal is an NTSC television signal.

14. An arrangement for decoding and recoding a composite digital PAL color television signal before and after, respectively, the processing thereof, said color television signal having at least a luminance component and first and second chrominance components, the arrangement comprising:

decoder means including:

separating means from said composite PAL color signal said first and second chrominance components, each of said chrominance components and the luminance component of said composite digital PAL television signal having the same predetermined sample rate;

first and second sample rate reducer means for respectively reducing the sample rates of the separated first and second chrominance components to provide sample-reduced first and second chrominance components which form first and second decoder output signals, respectively;

first and second interpolator means for respectively interpolating samples in the sample-reduced first and second chrominance components in response to the respective sample-reduced first and second chrominance components to provide interpolated first and second chrominance components to restore the sample rates thereof to said predetermined sample rate;

first adder means for adding the interpolated first and second chrominance components together to form a sum chrominance component; and subtractor means for subtracting said sum chrominance component from said composite digital PAL television signal to form a third decoder output signal containing said luminance component and information as to errors in the samples interpolated into the sample-reduced first and second chrominance components; and recoder means acting on said first, second and third decoder output signals after the processing thereof as said color television signal and including:

third and fourth interpolator means for respectively interpolating samples into the processed first and second decoder output signals in a manner substantially identical to that of said first and second interpolator means, respectively, and in response to the respective processed first and second decoder output signals to provide interpolated third and fourth chrominance components having their sample rates restored to said predetermined sample rate;

second adder means for adding the interpolated third and fourth chrominance components obtained from said third and fourth interpolator means, respectively, to form a second sum chrominance component; and third adder means for adding the second sum chrominance component obtained from said second adder means to the processed third decoder output signal to provide a reformed composite digital PAL color television signal in which errors due to interpolation are compensated.

15. An arrangement according to claim 14 wherein said separating means comprises a first filter for separating said first and second chrominance components from said composite digital PAL television signal and second and third filters for separating said first and second chrominance components from each other.

16. An arrangement according to claim 15 wherein skaid first filter is one of a high-pass and band-pass filter and said second and third filters are comb filters.

17. An arrangement according to claim 14 wherein said first and second sample rate reducer means reduce the sample rates of said first and second chrominance components respectively by a factor of three.

18. An arrangement according to claim 14 wherein said composite digital PALF television signal is supplied to said subtractor means by way of delay means which compensates for delay in the supply of said first-mentioned sum chrominance component to said subtractor means.

19. An arrangement according to claim 14 which, for said processing further a digital video recorder to which said first, second and third decoder output signals are supplied for recording and subsequent reproduction before being supplied to said recoder.

20. An arrangement according to claim 19 wherein said digital video recorder is a digital video tape recorder.

21. A decoder-recoder arrangement according to claim 14 wherein said decoder means includes first and second demodulator means for respectively demodulating said first and second chrominance components from said means for separating, and first and second modulator means for modulating the interpolated first and second chrominance components from said first and second interpolator means, respectively; and said recoder means includes third and fourth modulator means for modulating the interpolated third and fourth chrominance components from said third and fourth interpolator means, respectively.

* * * * *